United States Patent
Ishigaki et al.

(10) Patent No.: US 10,253,889 B2
(45) Date of Patent: Apr. 9, 2019

(54) GATE VALVE

(71) Applicant: SMC CORPORATION, Chiyoda-ku (JP)

(72) Inventors: Tsuneo Ishigaki, Kitakatsushikagun (JP); Hiromi Shimoda, Noda (JP); Takashi Nagao, Abiko (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/012,279

(22) Filed: Feb. 1, 2016

(65) Prior Publication Data
US 2016/0238150 A1    Aug. 18, 2016

(30) Foreign Application Priority Data
Feb. 12, 2015    (JP) .................................. 2015-025685

(51) Int. Cl.
*F16K 3/30* (2006.01)
*F16K 51/02* (2006.01)
*F16K 3/02* (2006.01)

(52) U.S. Cl.
CPC ................ *F16K 3/30* (2013.01); *F16K 51/02* (2013.01); *F16K 3/0218* (2013.01); *F16K 3/0272* (2013.01)

(58) Field of Classification Search
CPC ....... F16K 51/02; F16K 3/0218; F16K 3/0272
See application file for complete search history.

(56) References Cited

U.S. PATENT DOCUMENTS

| 769,831 | A | * | 9/1904 | Ogden | ................. | F16K 3/0227 |
| | | | | | | 251/328 |
| 2,862,040 | A | * | 11/1958 | Curran | ................. | H02G 3/0616 |
| | | | | | | 174/51 |

(Continued)

FOREIGN PATENT DOCUMENTS

| JP | 61-44017 | 3/1986 |
| JP | 61-45612 | 3/1986 |

(Continued)

OTHER PUBLICATIONS

Japanese Office Action dated Jul. 3, 2018 in in Japanese Application No. 2015-025685, with English translation, 10 pages.

*Primary Examiner* — R. K. Arundale
*Assistant Examiner* — Patrick Williams
(74) *Attorney, Agent, or Firm* — Oblon, McClelland, Maier & Neustadt, L.L.P.

(57) ABSTRACT

To provide a gate valve such that two connected surfaces perpendicular to each other of a valve plate housing frame can be connected to two side walls perpendicular to each other of a chamber in such a manner that the connected surfaces are in contact with the side surfaces. When screwing a fixation screw perpendicularly into a screw hole formed in one chamber wall of a chamber through a screw insertion hole formed in one frame wall of a valve plate housing frame of a gate valve, and tightening the fixation screw to press and fix the frame wall against and to the first chamber wall, a thrust force in a direction perpendicular to the axis of the fixation screw is generated in the valve plate housing frame by a cam mechanism formed on the fixation screw and in the screw insertion hole, and the other frame wall of the valve plate housing frame is pressed against and fixed to the other chamber wall of the chamber by the thrust force.

12 Claims, 14 Drawing Sheets

(56) References Cited

U.S. PATENT DOCUMENTS

| | | | |
|---|---|---|---|
| 4,556,157 A | 12/1985 | Shapland | |
| 4,573,616 A * | 3/1986 | Shapland | B22D 41/24 222/600 |
| 5,141,357 A * | 8/1992 | Sherman | F16B 5/025 403/4 |
| 5,909,867 A * | 6/1999 | Blecha | F16K 3/0272 251/328 |
| 6,443,426 B1 * | 9/2002 | Brenes | F16K 51/02 251/291 |
| 2016/0305465 A1 * | 10/2016 | Hess | F16B 37/00 |

FOREIGN PATENT DOCUMENTS

| | | |
|---|---|---|
| JP | 61-78554 | 4/1986 |
| JP | 4210391 | 1/2009 |

\* cited by examiner

GATE VALVE

TECHNICAL FIELD

The present invention relates to a gate valve that is attached to a chamber wall of a vacuum chamber in a semiconductor processing apparatus and that opens and closes an opening formed in the chamber wall with a valve plate.

BACKGROUND ART

In a semiconductor processing apparatus, a gate valve is used for opening and closing an opening communicating with a vacuum chamber. This semiconductor processing apparatus is very expensive, and accuracy is required in processing, and therefore maintenance is indispensable. In the maintenance, works, such as removing the gate valve from a vacuum chamber and replacing a deteriorated valve plate and deteriorated seal members and the like, are performed. Part of the vacuum chamber to which a gate valve is attached and its vicinity are very complicated. Therefore, in recent years, a gate valve having a structure described in Patent Literature 1 has been used so that the removal and reattachment of the gate valve, the replacement of a valve plate, and the like can be performed as easily and quickly as possible.

This known gate valve is formed such that a closing assembly is formed by integrating a valve plate (closing plate) that opens and closes the opening (through-hole), a valve plate housing frame (housing-like member) that houses the valve plate, a valve shaft (piston rod) connected to the valve plate, and an operation mechanism portion (cylinder unit) that operates the opening and closing of the valve plate via the valve shaft, the closing assembly is detachably attached to the vacuum chamber by fixing the valve plate housing frame to a side wall of the chamber with a fixation screw, and the opening communicating with the valve plate housing frame is opened and closed by the valve plate.

Thus, during maintenance, by removing the whole closing assembly from the vacuum chamber, the replacement of the valve plate and seal members and the like can be performed easily.

CITATION LIST

Patent Literature

PTL 1: Japanese Patent No. 4210391

SUMMARY OF INVENTION

Technical Problem

In the case of the known gate valve, when fixing the valve plate housing frame to a side wall of a chamber with a fixation screw, it is necessary to bring two connected surfaces perpendicular to each other of the valve plate housing frame into contact with two side walls perpendicular to each other of the chamber. For this reason, in the gate valve, screw attachment holes for attaching the fixation screw are formed in one of the connected surfaces of the valve plate housing frame and one of the side walls of the chamber so as to be inclined at 45 degrees with respect to both the connected surface and the side wall, the fixation screw is screwed into the inclined attachment hole, and the two connected surfaces of the valve plate housing frame are thereby brought into contact with the two side walls of the chamber.

However, such a method in which the valve plate housing frame is fixed to a side wall of the chamber with inclined attachment holes, has troublesomeness such that it is hard to obtain the positional accuracy when processing the attachment holes, a multifunction processing machine needs to be used for the processing, and workpieces need to be fixed at an angle, and therefore has drawbacks such as poor processability and expensiveness.

It is an object of the present invention to provide a gate valve a valve plate housing frame of which can be connected to a side wall of a chamber without using an inclined attachment screw, with two connected surfaces perpendicular to each other of the valve plate housing frame in contact with two side walls perpendicular to each other of the chamber, and that has a simple and reasonable design structure.

Solution to Problem

To attain the above object, the present invention provides a gate valve that is attached so as to straddle a first chamber wall and a second chamber wall connected perpendicularly to each other of a chamber and that opens and closes an opening formed in the first chamber wall with a valve plate, the gate valve including a valve plate housing frame having a first frame wall that is pressed against the first chamber wall and a second frame wall that is pressed against the second chamber wall, a communication opening that is formed in the first frame wall so as to communicate with the opening, the valve plate that is displaced in the valve plate housing frame and thereby opens and closes the communication opening, an operation mechanism portion that operates the opening and closing of the valve plate, and a fixing device for fixing the valve plate housing frame to the first chamber wall or the second chamber wall, wherein the fixing device includes a fixation screw that is screwed into a screw hole formed perpendicularly in one of the first chamber wall and the second chamber wall, and a screw insertion hole that is formed perpendicularly in one of the first frame wall and the second frame wall of the valve plate housing frame corresponding to the one chamber wall and through which the fixation screw is passed, a cam mechanism that generates a thrust force in a direction perpendicular to the axis of the fixation screw in the valve plate housing frame when tightening the fixation screw to press and fix the one frame wall against and to the one chamber wall is formed on the fixation screw and in the screw insertion hole, and the other frame wall of the valve plate housing frame is pressed against the other chamber wall of the chamber by the thrust force.

According to a specific embodiment of the present invention, the cam mechanism has a cam surface that is a uniform inclined surface formed on the fixation screw, and a cam receiving surface that is a uniform inclined surface formed in the screw insertion hole, and the inclination direction and inclination angle of the cam surface and the inclination direction and inclination angle of the cam receiving surface are respectively equal to each other.

In this case, it is preferable that the cam surface be formed on a cam member provided integrally with or separately from the fixation screw, and the cam receiving surface be formed on the inner surface of the screw insertion hole.

It is preferable that the cam member be formed separately from the fixation screw, and be attached to the fixation screw in such a manner that the cam member is relatively rotatable about the axis of the fixation screw but is restricted from moving in the direction of the axis.

According to a specific embodiment of the present invention, the cam surface and the cam receiving surface are both planar.

In this case, it is preferable that the cam member be non-circular in front view, the cam surface be formed on the outer surface of the cam member, the screw insertion hole have a cam member fitting portion in which the cam member is nonrotatably fitted, and the cam receiving surface be formed on the inner surface of the cam member fitting portion.

According to another specific embodiment of the present invention, the cam surface and the cam receiving surface both have conical surface shapes, and the outside diameter of the largest part of the conical surface forming the cam surface is smaller than the inside diameter of the smallest part of the conical surface forming the cam receiving surface.

In this case, it is preferable that the cam member be cylindrical, the conical cam surface be formed on the cam member, the screw insertion hole have a small diameter hole portion and a large diameter hole portion that are circular and have different diameters, and the conical cam receiving surface be formed between the small diameter hole portion and the large diameter hole portion.

Advantageous Effects of Invention

According to the present invention, owing to the combination of an attachment screw that is attached perpendicularly to a frame wall of a valve plate housing frame and a chamber wall of a chamber, and a cam mechanism, the valve plate housing frame can be fixed to the chamber wall of the chamber with two frame walls perpendicular to each other of the valve plate housing frame pressed against two chamber walls perpendicular to each other of the chamber.

DESCRIPTION OF EMBODIMENTS

Figure 1:
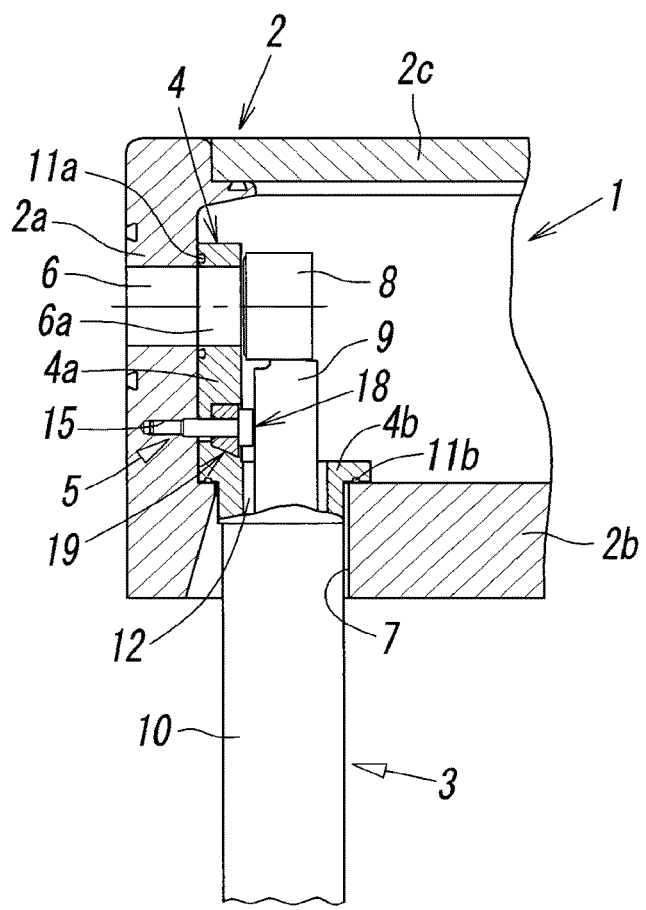
FIG. 1 is a partial sectional view showing a first embodiment of the present invention, and shows a state where a first frame wall of a valve plate housing frame of a gate valve is connected to a first chamber wall of a chamber with fixing devices.
Figure 2:
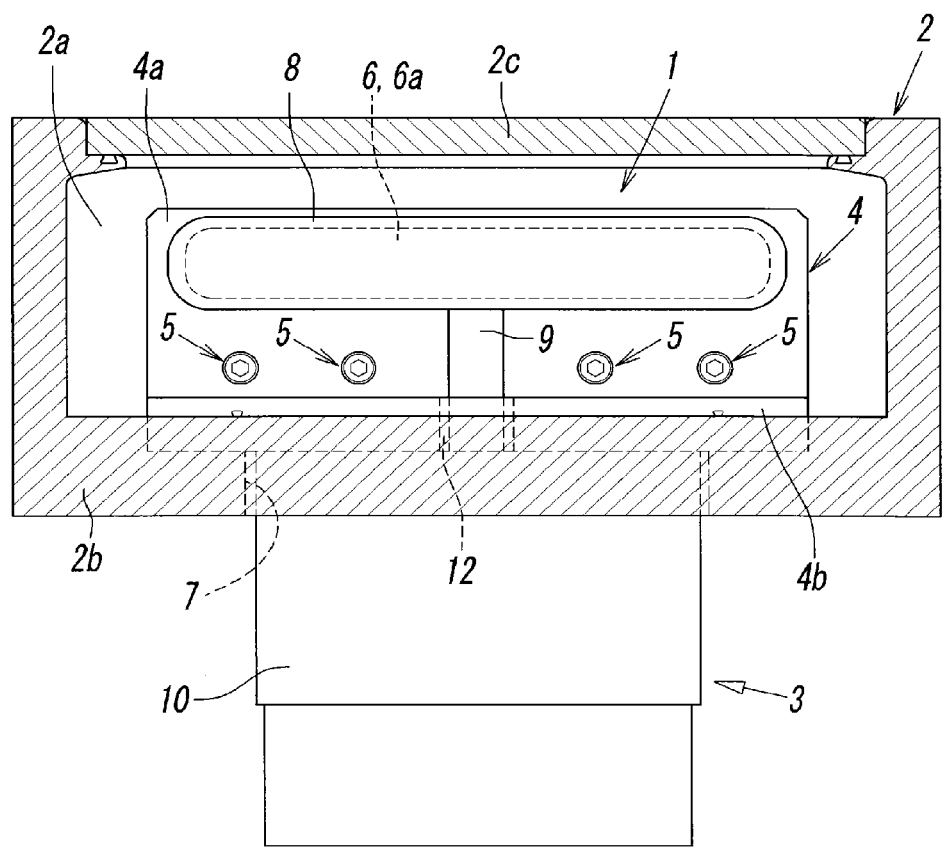
FIG. 2 is a right side view of FIG. 1.

FIG. 1 and FIG. 2 show a first embodiment of a gate valve according to the present invention. In the figures, reference sign 1 denotes a vacuum chamber (hereinafter simply referred to as a "chamber") for processing a semiconductor, reference sign 2 denotes a chamber wall surrounding the chamber 1, reference sign 3 denotes a gate valve attached to the chamber wall 2 of the chamber 1 with a valve plate housing frame 4 interposed therebetween, and reference sign 5 denotes fixing devices for fixing the valve plate housing frame 4 to the chamber wall 2.

The chamber 1 is a rectangular parallelepiped shaped chamber surrounded by the chamber wall 2, has a longitudinal direction and transverse direction, and performs various processes on the semiconductor with its inside evacuated. Of the chamber wall 2, a first chamber wall 2*a* located at one longitudinal end of the chamber 1 has a horizontally elongated opening 6 for transferring the semiconductor into and from the chamber 1, and a second chamber wall (bottom wall) 2*b* perpendicularly connected to the lower end of the first chamber wall 2*a* has a valve fitting hole 7 in which part of the gate valve 3 is fitted. A third chamber wall (top wall) 2*c* opposed to the second chamber wall 2*b* is an openable and closable lid. With the third chamber wall 2*c* open, the gate valve 3 is inserted into the chamber 1, and the gate valve 3 is fixed with the fixing devices 5 to the first chamber wall 2*a* with the valve plate housing frame 4 interposed therebetween.

The gate valve 3 includes the valve plate housing frame 4, a communication opening 6*a* that is formed in a first frame wall 4*a* of the valve plate housing frame 4 so as to communicate with the opening 6, a valve plate 8 that is displaced in the valve plate housing frame 4, opens and closes the communication opening 6*a*, and thereby opens and closes the opening 6, an operation mechanism portion 10 that operates the opening and closing of the valve plate 8 via a valve shaft 9, and the fixing devices 5 that fix the valve plate housing frame 4 to the chamber wall 2 of the chamber 1. The valve plate housing frame 4, the valve plate 8, the valve shaft 9, and the operation mechanism portion 10 are assembled integrally as one structure.

The valve plate housing frame 4 includes the first frame wall 4*a* that is parallel to the first chamber wall 2*a* of the chamber 1, and a second frame wall 4*b* perpendicularly connected to the first frame wall 4*a*. When the valve plate housing frame 4 is attached to the chamber wall 2 of the chamber 1, the first frame wall 4*a* is pressed against the inner surface of the first chamber wall 2*a* of the chamber 1 with a first seal member 11*a* surrounding the opening 6 interposed therebetween, and the second frame wall 4b is pressed against the inner surface of the second chamber wall 2b of the chamber 1 with a second seal member 11b surrounding the valve fitting hole 7 interposed therebetween. The first seal member 11a is attached to the first frame wall 4a, and the second seal member 11b is attached to the second frame wall 4b.

The second frame wall 4b of the valve plate housing frame 4 is connected to the upper end of the operation mechanism portion 10 by a connecting device (not shown).

A shaft hole 12 in the second frame wall 4b through which the valve shaft 9 is passed communicates with the chamber 1, and is closed off to the atmosphere by a bellows or the like in the operation mechanism portion 10.

As is clear from FIGS. 3A, 3B, 4A and 4B, the fixing devices 5 each include a screw hole 15 and a guide hole 16 that are formed in the first chamber wall 2a of the chamber 1 perpendicularly to the chamber wall 2a, a screw insertion hole 17 that is formed in the first frame wall 4a of the valve plate housing frame 4 perpendicularly to the frame wall 4a, a fixation screw 18 screwed into the screw hole 15 through the screw insertion hole 17, and a cam mechanism 19 consisting of a cam surface 20 and a cam receiving surface 21 formed on the fixation screw 18 and in the screw insertion hole 17.

A plurality of the fixing devices 5 are provided at positions distant from the communication opening 6a of the first frame wall 4a, that is, at positions near the second frame wall 4b.

The screw insertion hole 17 has a long-hole-like shape extending in the height direction of the first frame wall 4a, and has a rectangular cam member fitting portion 22 at an end of the screw insertion hole 17 that opens into the chamber 1. Therefore, the cam member fitting portion 22 is part of the screw insertion hole 17. However, in the following description, for convenience of description, the long-hole-shaped part will be referred to as the "screw insertion hole 17," and the rectangular part will be referred to as the "cam member fitting portion 22."

The cam receiving surface 21 that is a planar inclined surface is formed on one of the four inner side surfaces of the cam member fitting portion 22 that is nearest to the second frame wall 4b. The cam receiving surface 21 is uniformly inclined so as to gradually approach the second frame wall 4b as it goes toward the open end of the cam member fitting portion 22.

The angle formed between the cam receiving surface 21 and an insertion hole axis L1 that is the central axis of the screw insertion hole 17 is preferably 45 degrees or less and more preferably about 20 to 30 degrees. The angle is 25 degrees in the shown example.

The fixation screw 18 includes, in order from the distal end to the proximal end along a screw axis L2 that is the central axis thereof, a threaded portion 18a on which an external thread is formed, a cylindrical portion 18b on which no external thread is formed, and a circular screw head 18c in which a hexagon socket 18d for rotating operation is formed.

A cam member 23 that has a rectangular shape in front view is attached to the cylindrical portion 18b relatively rotatably about the screw axis L2 with its movement in the direction of the screw axis L2 restricted by a locking ring 24. The cam surface 20 that is in contact with the cam receiving surface 21 is formed on one of the four outer side surfaces of the cam member 23 that faces the cam receiving surface 21 of the cam member fitting portion 22. This cam surface 20 is a planar inclined surface, and is uniformly inclined in the same direction as the cam receiving surface 21, that is, so as to gradually approach the screw axis L2 as it goes toward the distal end of the fixation screw 18. The angle formed between the cam surface 20 and the screw axis L2 is the same as the angle formed between the cam receiving surface 21 and the insertion hole axis L1, and is 25 degrees in the shown example.

Owing to the cam mechanism 19 formed by the cam surface 20 and the cam receiving surface 21, when tightening the fixation screw 18 to fix the first frame wall 4a to the first chamber wall 2a, a thrust force in a direction perpendicular to the screw axis L2 of the fixation screw 18 is generated in the valve plate housing frame 4, and the second frame wall 4b of the valve plate housing frame 4 is pressed against the second chamber wall 2b of the chamber 1 by the thrust force.

The operation to fix the gate valve 3 to the chamber wall 2 of the chamber 1 with the fixing devices 5 is performed as follows.

Figure 4A:
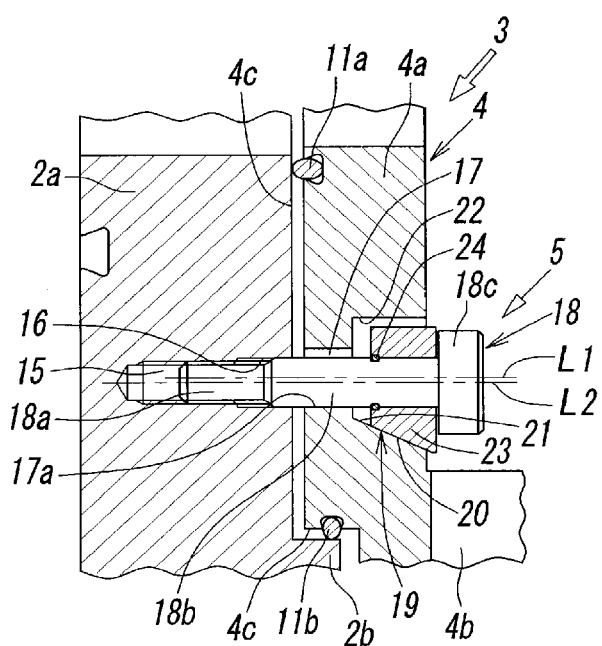
FIG. 4A is a sectional view of a preliminary state before tightening the fixation screw in FIG. 3A.
Figure 4B:
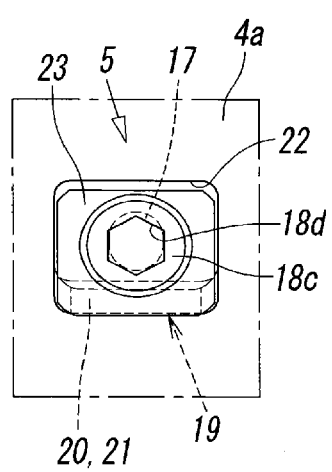
FIG. 4B is a right side view of FIG. 4A.

FIGS. 4A and 4B show a preliminary state before fixing the valve plate housing frame 4 of the gate valve 3 housed in the chamber 1 to the first chamber wall 2a of the chamber 1 with the fixing device 5. This preliminary state is a state where part of the distal end of the threaded portion 18a of the fixation screw 18 is screwed into the screw hole 15, the distal end of the cylindrical portion 18b is fitted in the guide hole 16, and the fixation screw 18 is thereby temporarily fastened to the first chamber wall 2a stably but is not yet tightened. At this time, the first seal member 11a and the second seal member 11b are not yet compressed, and therefore the wall surfaces 4c of the first frame wall 4a and the second frame wall 4b of the valve plate housing frame 4 are out of contact with the inner surfaces of the first chamber wall 2a and the second chamber wall 2b of the chamber 1. The cam surface 20 of the cam member 23 is in contact with the cam receiving surface 21 of the cam member fitting portion 22 at a position near the open end of the cam member fitting portion 22, and the cylindrical portion 18b of the fixation screw 18 is located near a first hole end 17a that is one of both ends in the long axis direction of the screw insertion hole 17 that is nearer to the second frame wall 4b.

Figure 5A:
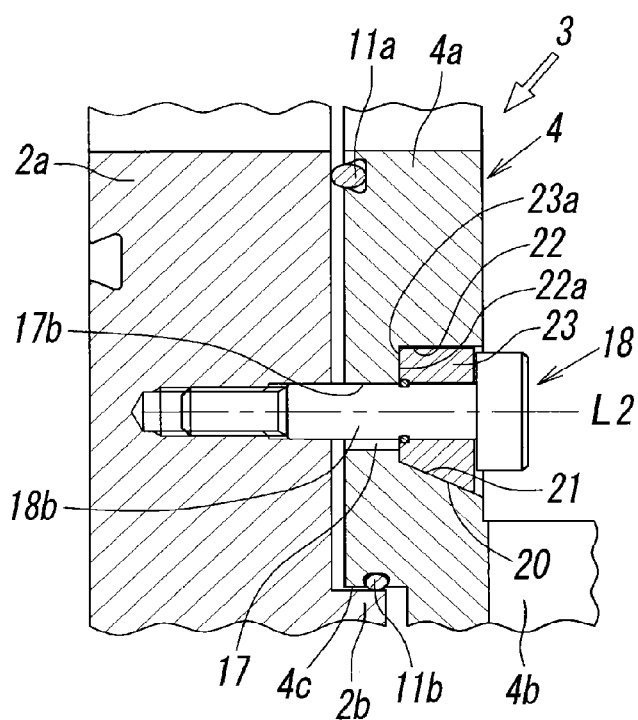
FIG. 5A is a sectional view showing a state where the fixation screw is tightened from the preliminary state of FIG. 4A to an intermediate tightening position.
Figure 5B:
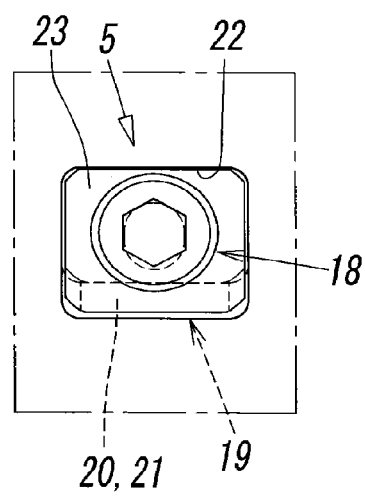
FIG. 5B is a right side view of FIG. 5A.

When the fixation screw 18 is screwed in from the preliminary state of FIG. 4A, the fixation screw 18 moves forward while rotating, whereas the cam member 23 moves forward without rotating in the cam member fitting portion 22, and as shown in FIGS. 5A and 5B, the fixation screw 18 reaches an intermediate tightening position where a pressing surface 23a at the distal end of the cam member 23 is in contact with a pressed surface 22a at the bottom of the cam member fitting portion 22. At this time, the cam surface 20 of the cam member 23 presses the cam receiving surface 21 while sliding along the cam receiving surface 21, and therefore, a vertical component force in a direction perpendicular to the screw axis L2 acts as a thrust force on the valve plate housing frame 4. By this thrust force, the valve plate housing frame 4 is pushed toward the second chamber wall 2b of the chamber 1, and the second frame wall 4b is pressed against the second chamber wall 2b while compressing the second seal member 11b. At this time, the wall surface 4c of the second frame wall 4b may be in contact with the inner surface of the second chamber wall 2b, but is preferably separated from the second chamber wall 2b with a slight gap between itself and the inner surface.

Owing to the movement of the valve plate housing frame 4, the cylindrical portion 18b of the fixation screw 18 is located near a second hole end 17b opposite to the first hole end 17a of the screw insertion hole 17.

A component force in a direction parallel to the screw axis L2 also acts on the valve plate housing frame 4. By this parallel component force, the valve plate housing frame 4 is also pushed toward the first chamber wall 2a. This parallel component force is smaller than the vertical component force, and therefore, the valve plate housing frame 4 is slightly displaced toward the first chamber wall 2a while slightly compressing the first seal member 11a.

Figure 3A:
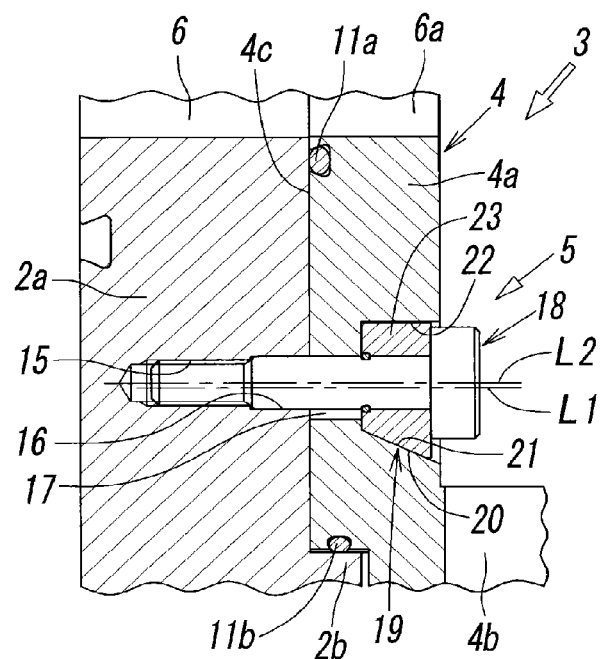
FIG. 3A is a partial enlarged view of FIG. 1.
Figure 3B:
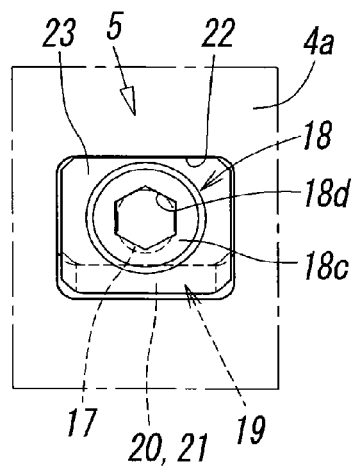
FIG. 3B is a right side view of FIG. 3A.

Next, when the fixation screw 18 is further screwed in from the intermediate tightening position of FIG. 5A and is tightened to a final tightening position shown in FIGS. 3A and 3B, the valve plate housing frame 4 is displaced toward the first chamber wall 2a of the chamber 1, and the first frame wall 4a is pressed against the first chamber wall 2a while compressing the first seal member 11a. At this time, the second frame wall 4b is pressed against the second chamber wall 2b while compressing the second seal member 11b, and is displaced along the second chamber wall 2b while remaining in that state. Therefore, it is preferable that the second seal member 11b be subjected to non-adhesive treatment in order to prevent the second seal member 11b from adhering to the second chamber wall 2b to generate dust.

The wall surface 4c of the first frame wall 4a may be in contact with the inner surface of the first chamber wall 2a or may be separated from the inner surface of the first chamber wall 2a with a slight gap kept therebetween. However, in order to prevent the first frame wall 4a from being displaced by the pressing force when the communication opening 6a is closed by the valve plate 8, the first frame wall 4a is preferably in contact with the first chamber wall 2a. In that case, in order to minimize the generation of dust due to metal touch, it is preferable that only parts of the wall surface 4c of the first frame wall 4a be in contact with the first chamber wall 2a and the other wall surface part be formed in a recessed shape and be thereby out of contact with the first chamber wall 2a. In that case, the wall surface parts brought into contact with the first chamber wall 2a are preferably a part of the upper end of the first frame wall 4a that is on the outer side of the first seal member 11a, and parts around the screw insertion holes 17.

Thus, by tightening the fixation screws 18 of all the fixing devices 5, the fixation of the valve plate housing frame 4 to the chamber wall 2 of the chamber 1, that is, the attachment of the gate valve 3 to the chamber 1 is completed.

The removal of the gate valve 3 from the chamber 1 for maintenance or the like may be performed in a reverse procedure to the above-described attachment procedure. In this case, since the cam member 23 attached to the fixation screw 18 is locked to the fixation screw 18 by the locking ring 24, when removing the fixation screw 18, the cam member 23 is removed from the cam member fitting portion 22 together with the fixation screw 18.

Figure 6:
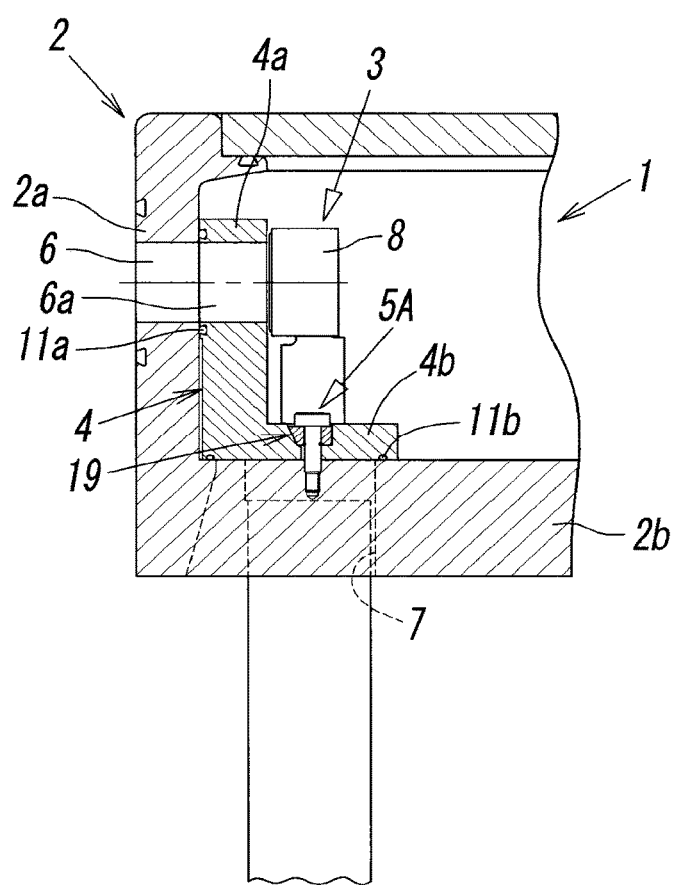
FIG. 6 is a partial sectional view showing a second embodiment of the present invention, and shows a state where a second frame wall of a valve plate housing frame of a gate valve is connected to a second chamber wall of a chamber with fixing devices.
Figure 7:
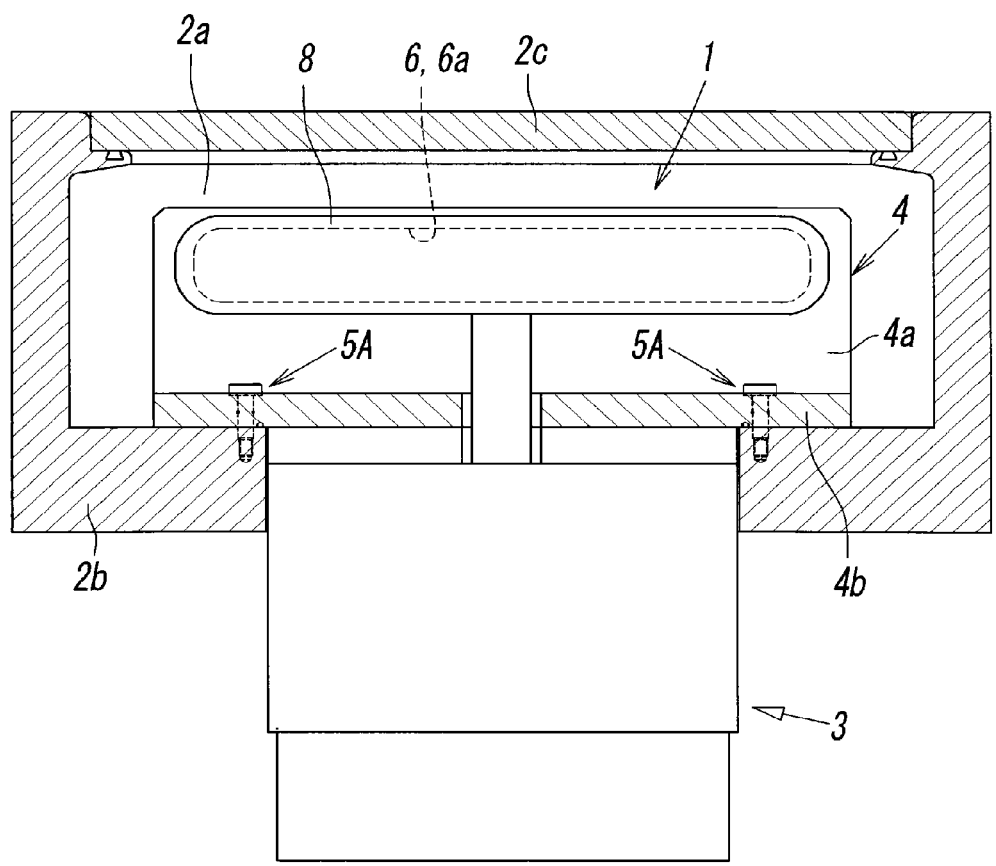
FIG. 7 is a right side view of FIG. 6.

FIG. 6 and FIG. 7 show a second embodiment of the present invention. The second embodiment differs from the first embodiment in that a second frame wall 4b of a valve plate housing frame 4 is fixed to a second chamber wall 2b of a chamber 1 with a plurality of fixing devices 5A. For this reason, in the shown example, a fixing device 5A is provided on each outer side in the longitudinal direction of a valve fitting hole 7 formed in the second chamber wall 2b.

As is clear from FIGS. 8A, 8B, 9A and 9B, the fixing devices 5A have substantially the same configuration as the fixing devices 5 of the first embodiment. That is, the fixing devices 5A each include a screw hole 15 and a guide hole 16 that are formed in the second chamber wall 2b of the chamber 1 perpendicularly to the chamber wall 2b, a screw insertion hole 17 that is formed in the second frame wall 4b of a valve plate housing frame 4 perpendicularly to the frame wall 4b, a fixation screw 18 screwed into the screw hole 15 through the screw insertion hole 17, and a cam mechanism 19 formed on the fixation screw 18 and in the screw insertion hole 17.

The cam mechanism 19 is formed by a cam surface 20 that is formed on one of the outer side surfaces of a cam member 23 attached to the fixation screw 18, and a cam receiving surface 21 that is formed on one of the inner side surfaces of the cam member fitting portion 22 in the screw insertion hole 17. The cam surface 20 and the cam receiving surface 21 are formed on side surfaces of the cam member 23 and the cam member fitting portion 22 that are located nearest to the first frame wall 4a.

In the second embodiment, the procedure for fixing the second frame wall 4b of the valve plate housing frame 4 to the second chamber wall 2b of the chamber 1 with the fixing devices 5A is substantially the same as that in the case of the first embodiment.

Figure 9A:
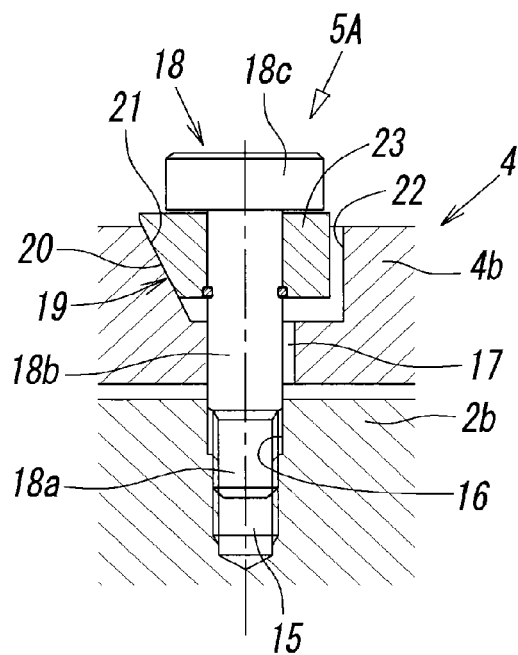
FIG. 9A is a sectional view of a preliminary state before tightening the fixation screw in FIG. 8A.
Figure 9B:
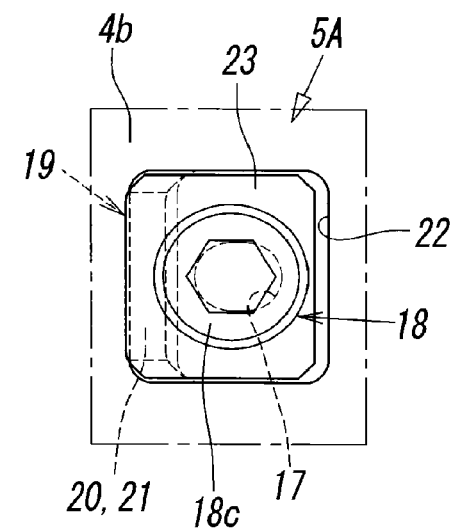
FIG. 9B is a plan view of FIG. 9A.
Figure 10A:
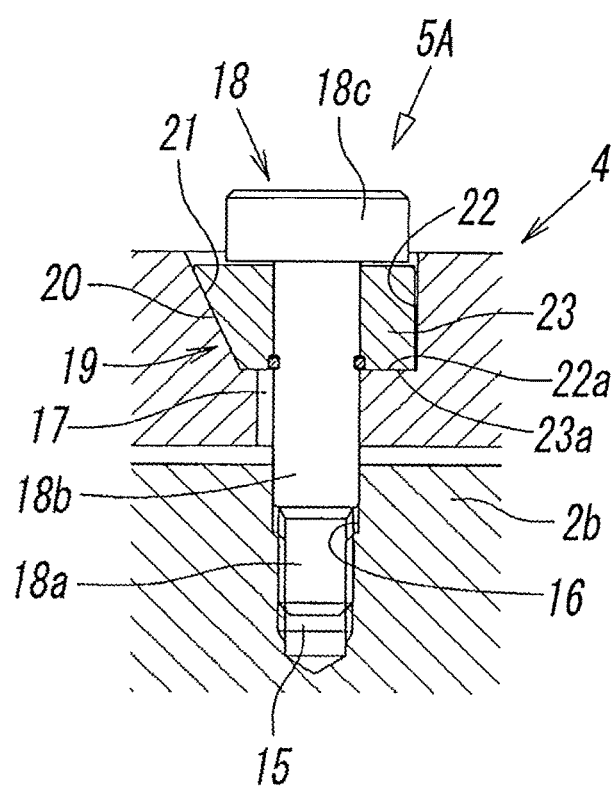
FIG. 10A is a sectional view showing a state where the fixation screw is tightened from the preliminary state of FIG. 9A to an intermediate tightening position.
Figure 10B:
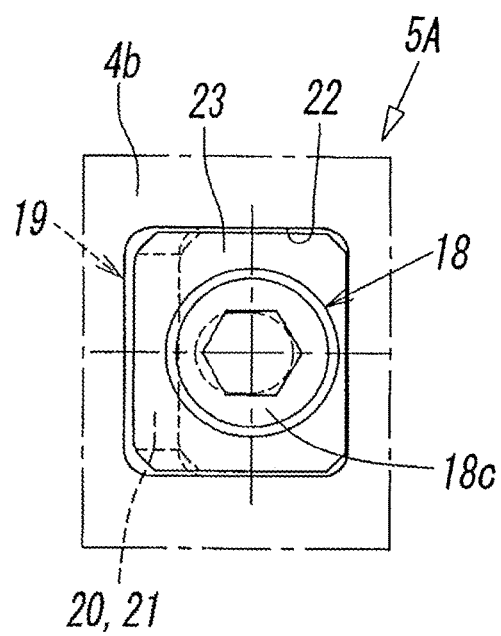
FIG. 10B is a plan view of FIG. 10A.

That is, the fixation screw 18 is screwed in from the preliminary state shown in FIGS. 9A and 9B to an intermediate tightening position where the pressing surface 23a of the cam member 23 is in contact with the pressed surface 22a at the bottom of the cam member fitting portion 22 as shown in FIGS. 10A and 10B, and the cam surface 20 of the cam mechanism 19 thereby presses the cam receiving surface 21 to displace the valve plate housing frame 4 toward the first chamber wall 2a of the chamber 1. Therefore, the first frame wall 4a is pressed against the first chamber wall 2a while compressing the first seal member 11a.

Figure 8A:
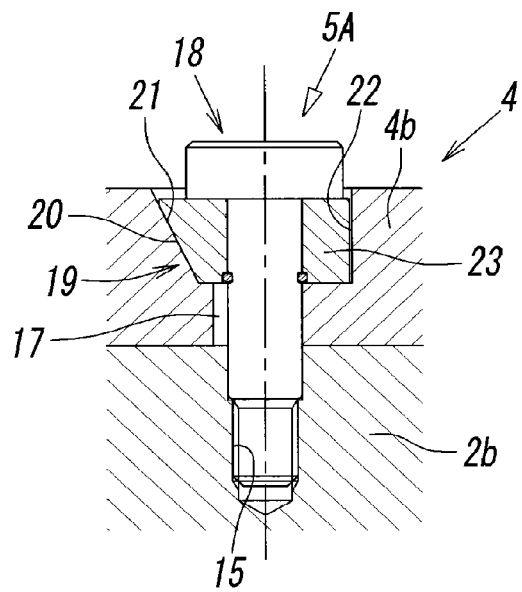
FIG. 8A is a partial enlarged view of FIG. 6.
Figure 8B:
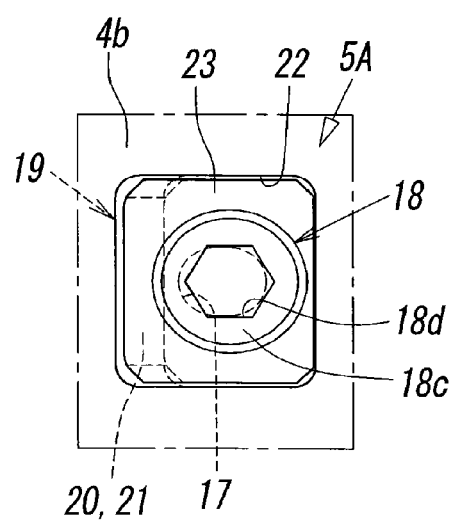
FIG. 8B is a plan view of FIG. 8A.

Next, the fixation screw 18 is further screwed in from the intermediate tightening position of FIGS. 10A and 10B and is tightened to a final tightening position shown in FIGS. 8A and 8B, the valve plate housing frame 4 is thereby displaced toward the second chamber wall 2b of the chamber 1, and the second frame wall 4b is pressed against the second chamber wall 2b while compressing the second seal member 11b. At this time, the first frame wall 4a pressed against the first chamber wall 2a is displaced along the first chamber wall 2a while remaining in that state.

Thus, by tightening the fixation screws 18 of the two fixing devices 5A, the fixation of the valve plate housing frame 4 to the chamber wall 2 of the chamber 1, that is, the attachment of the gate valve 3 to the chamber 1 is completed.

In the second embodiment, in order to reduce the contact area with the first chamber wall 2a, the first frame wall 4a of the valve plate housing frame 4 is formed such that a part surrounding the first seal member 11a is in contact with the first chamber wall 2a and the other part is out of contact with the first chamber wall 2a.

Figure 11:
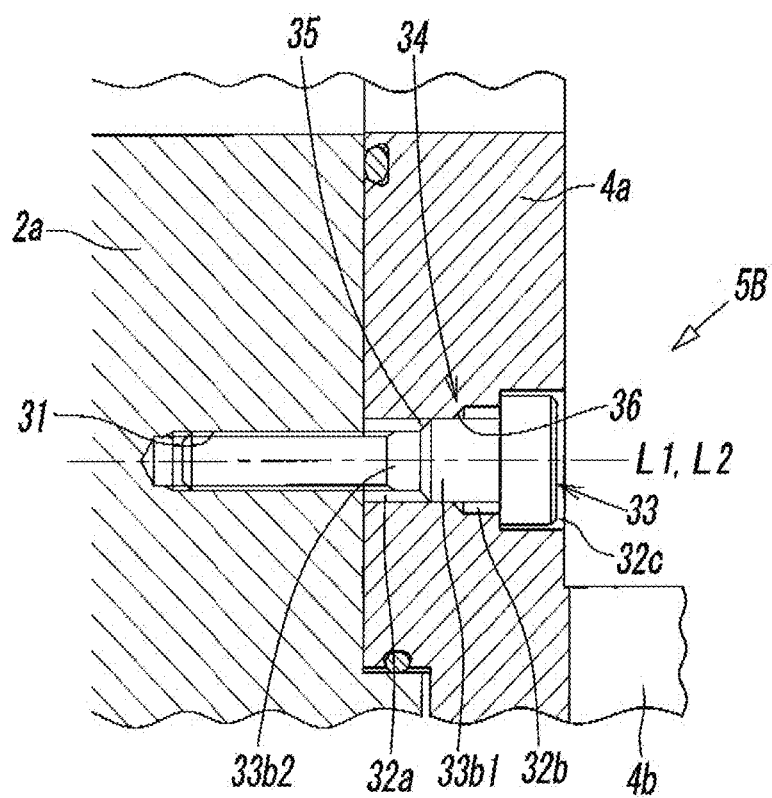
FIG. 11 shows a modification of a fixing device as a third embodiment of the present invention, and is a partial sectional view showing a state where a first frame wall of a valve plate housing frame of a gate valve is fixed to a first chamber wall of a chamber with the fixing device.
Figure 12:
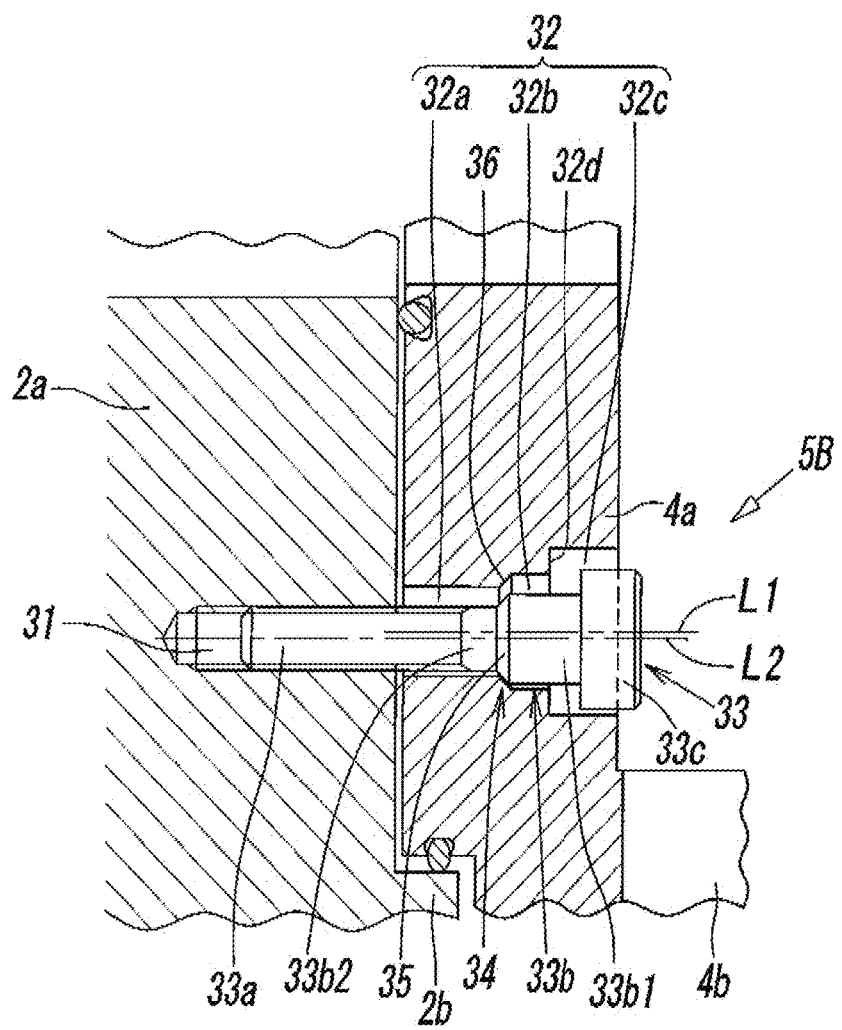
FIG. 12 is a partial sectional view of a preliminary state before tightening the fixation screw in FIG. 11.
Figure 13:
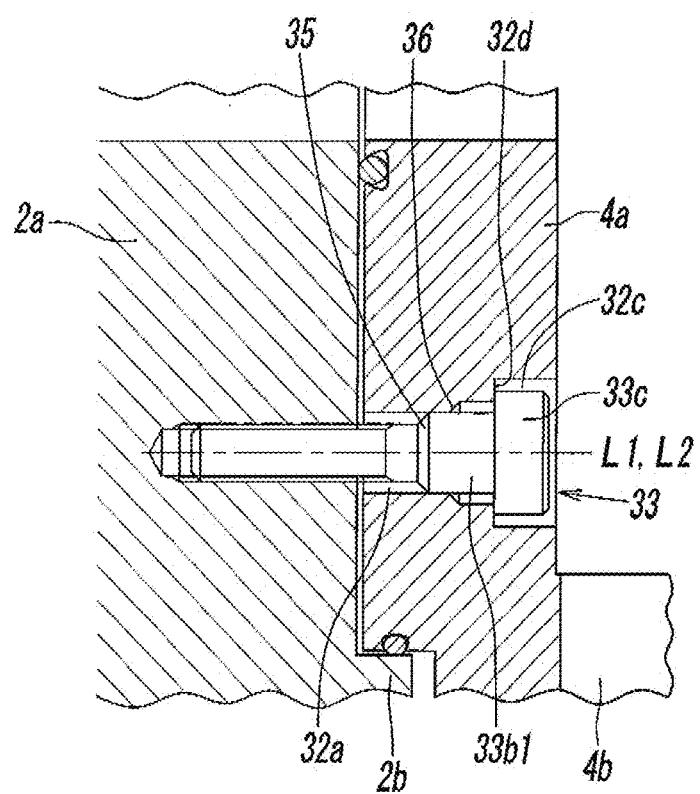
FIG. 13 is a partial sectional view showing a state where the fixation screw is tightened from the preliminary state of FIG. 12 to an intermediate tightening position.

FIG. 11 to FIG. 13 partly show a modification of a fixing device as a third embodiment of the present invention. This fixing device 5B differs from the fixing devices 5 and 5A of the first embodiment and the second embodiment in that inclined surfaces forming a cam surface 35 and a cam receiving surface 36 of a cam mechanism 34 both have conical surface shapes.

The configuration of the fixing device 5B of the third embodiment in a case where as in the case of the first embodiment shown in FIG. 1 and FIG. 2, a first frame wall 4a of a valve plate housing frame 4 is fixed to a first chamber wall 2a of a chamber 1 with the fixing device 5B, will be described below. In that case, for the configurations of components other than the fixing device 5B, such as the configurations of the chamber 1 and the valve plate housing frame 4 not described in FIG. 11 to FIG. 13, FIG. 1 and FIG. 2 are referred to as needed.

The fixing device 5B includes a screw hole 31 that is formed in the first chamber wall 2a of the chamber 1 perpendicularly to the chamber wall 2a, a screw insertion hole 32 that is formed in the first frame wall 4a of the valve plate housing frame 4 perpendicularly to the frame wall 4a, a fixation screw 33 that is passed through the screw insertion hole 32 and is screwed into the screw hole 31, and a cam mechanism 34 formed on the fixation screw 33 and in the screw insertion hole 32.

The screw insertion hole 32 is a circular hole and includes, in order from the distal end to the proximal end of the screw insertion hole 32 along the insertion hole axis L1, a small diameter hole portion 32a, a large diameter hole portion 32b larger in hole diameter than the small diameter hole portion, and a screw head fitting portion 32c larger in hole diameter than the large diameter hole portion 32b. The cam receiving surface 36 that has a conical surface shape is formed between the small diameter hole portion 32a and the large diameter hole portion 32b, and a seat portion 32d with which the screw head 33c of the fixation screw 33 comes into contact is formed at the bottom of the screw head fitting portion 32c.

The fixation screw 33 includes, in order from the distal end to the proximal end along the screw axis L2, a threaded portion 33a on which an external thread is formed, a cylindrical portion 33b on which no external thread is formed, and the circular screw head 33c having a hexagon socket. In the cylindrical portion 33b, a large diameter portion 33b1 on the proximal side (screw head 33c side) and a small diameter portion 33b2 on the distal side (threaded portion 33a side) that have different outside diameters are formed. The cam surface 35 having a conical surface shape is formed between the large diameter portion 33b1 and the small diameter portion 33b2.

The outside diameter of the large diameter portion 33b1 of the fixation screw 33 is smaller than the inside diameter of the large diameter hole portion 32b of the screw insertion hole 32, and is very slightly smaller than the inside diameter of the small diameter hole portion 32a so that the large diameter portion 33b1 can be snugly fitted in the small diameter hole portion 32a without rattling. Therefore, the outside diameter of the largest part of the conical surface forming the cam surface 35 is smaller than the inside diameter of the smallest part of the conical surface forming the cam receiving surface 36.

The procedure for fixing the first frame wall 4a of the valve plate housing frame 4 to the first chamber wall 2a of the chamber 1 with the fixing device 5B of the third embodiment having the above-described configuration is substantially the same as that in the case of the first embodiment.

That is, FIG. 12 shows a preliminary state where part of the distal end of the threaded portion 33a of the fixation screw 33 is screwed into the screw hole 31 of the screw insertion hole 32 and is temporarily fastened. In this preliminary state, the large diameter portion 33b1 of the fixation screw 33 is fitted in the large diameter hole portion 32b of the screw insertion hole 32, and part of the cam surface 35 is in contact with part of the cam receiving surface 36 but does not yet press the cam receiving surface 36. Therefore, the first frame wall 4a and the second frame wall 4b of the valve plate housing frame 4 are out of contact with the first chamber wall 2a and the second chamber wall 2b of the chamber 1. Therefore, the insertion hole axis L1 of the screw insertion hole 32 and the screw axis L2 of the fixation screw 33 are not coincide with each other.

When the fixation screw 33 is screwed in from the preliminary state shown in FIG. 12 to an intermediate tightening position where the screw head 33c is in contact with the seat portion 32d of the screw head fitting portion 32c as shown in FIG. 13, part of the cam surface 35 having a conical surface shape comes into contact with part of the cam receiving surface 36 having a conical surface shape, and presses the cam receiving surface 36 while sliding along the cam receiving surface 36, and the large diameter portion 33b1 is fitted in the small diameter hole portion 32a. Therefore, the valve plate housing frame 4 is pushed toward the second chamber wall 2b by a thrust force in a direction perpendicular to the insertion hole axis L1, and the second frame wall 4b is pressed against the second chamber wall 2b. The insertion hole axis L1 of the screw insertion hole 32 and the screw axis L2 of the fixation screw 33 are coincide with each other.

Next, when the fixation screw 33 is tightened to a final tightening position shown in FIG. 11, the valve plate housing frame 4 is displaced toward the first chamber wall 2a of the chamber 1, the first frame wall 4a is pressed against the first chamber wall 2a, and the fixation of the valve plate housing frame 4 is completed.

As with the fixing device 5A of the second embodiment shown in FIG. 6 and FIG. 7, the fixing device 5B of the third embodiment can also be used when fixing the second frame wall 4b of the valve plate housing frame 4 to the second chamber wall 2b of the chamber 1.

Figure 14:
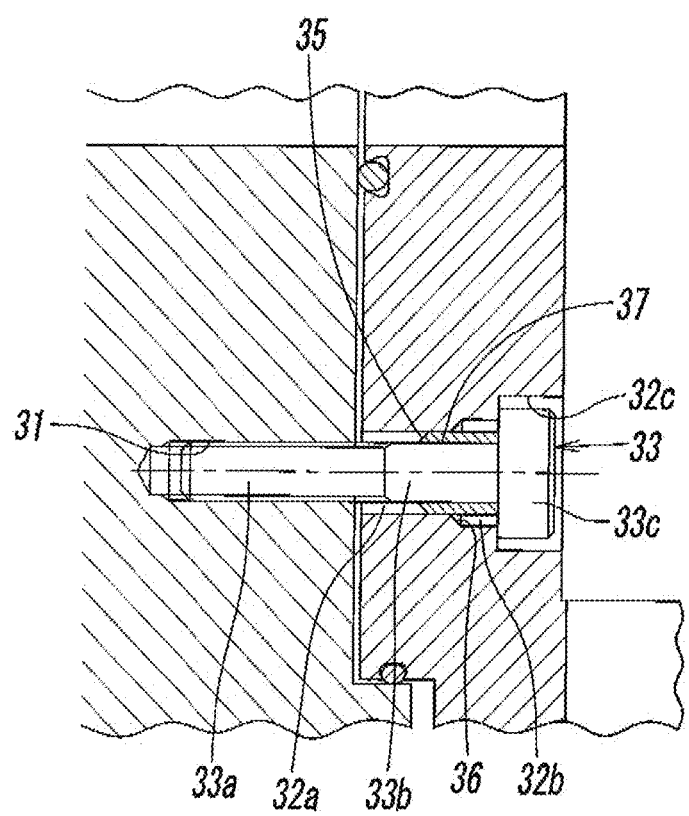
FIG. 14 is a sectional view showing another modification of the fixing device of the third embodiment.

In the fixing device 5B of the third embodiment, a cam surface 35 is directly formed on the cylindrical portion 33b of the fixation screw 33. However, as shown in FIG. 14, the cam surface 35 may be formed by attaching a cylindrical cam member 37 to the cylindrical portion 33b and forming a part, for example, the distal end, of this cam member 37 into a conical surface shape. In this case, the cam member 37 may be fixed to the fixation screw 33 or may be relatively rotatable. When the cam member 37 is rotatable, the cam member 37 is preferably attached to the fixation screw 33 with its movement in the direction of the screw axis L2 restricted in order to prevent the cam member 37 from remaining in the screw insertion hole 32 when the fixation screw 33 is removed from the screw insertion hole 32.

It can be said that, in the fixing device 5B of the third embodiment, the cylindrical portion 33b of the fixation screw 33 is integral with the cam member 37.

In the shown embodiments, the angle formed between the cam surface 20, 36 and the screw axis L2, and the angle formed between the cam receiving surface 21, 35 and the insertion hole axis L1 are both an angle smaller than 45 degrees (for example, 25 degrees), but the angles may be 45 degrees. By setting the cam surface 20, 36 and the cam receiving surface 21, 35 at 45 degrees, when the fixation screw 18, 33 is tightened and the cam surface 20, 36 presses the cam receiving surface 21, 35, thrust forces equal to each other can be caused to act on the cam receiving surface 21, 35, that is, the valve plate housing frame 4 in both a direction perpendicular to the screw axis L2 and a direction parallel to the screw axis L2. As a result, the valve plate housing frame 4 can be displaced such that both the first frame wall 4a and the second frame wall 4b approach both the first chamber wall 2a and the second chamber wall 2b of the chamber 1 at the same time. Therefore, the fixation of the valve plate housing frame 4 to the chamber wall 2 of the chamber 1 can be performed easily and smoothly.

REFERENCE SIGNS LIST 1 chamber
2 chamber wall
2a first chamber wall
2b second chamber wall
3 gate valve
4 valve plate housing frame
5, 5A, 5B fixing device
6 opening
6a communication opening
7 valve fitting hole
8 valve plate
10 operation mechanism portion
11a first seal member
11b second seal member
15 screw hole
17 screw insertion hole
18 fixation screw
18a threaded portion
18b cylindrical portion
18c screw head
19 cam mechanism
20 cam surface
21 cam receiving surface
22 cam member fitting portion
23 cam member
31 screw hole
32 screw insertion hole
32a small diameter hole portion
32b large diameter hole portion
33 fixation screw
33a threaded portion
33b cylindrical portion
33b1 large diameter portion
33b2 small diameter portion
33c screw head
34 cam mechanism
35 cam surface
36 cam receiving surface
37 cam member

The invention claimed is:

1. A gate valve that is attached so as to be pressed against a first chamber wall and a second chamber wall of a chamber connected perpendicularly to each other and that opens and closes an opening formed in the first chamber wall with a valve plate, the gate valve comprising:
 a valve plate housing frame having a first frame wall that is pressed against the first chamber wall and a second frame wall that is pressed against the second chamber wall;
 a communication opening that is formed in the first frame wall so as to communicate with the opening;
 the valve plate that is displaced in the valve plate housing frame and thereby opens and closes the communication opening;
 an operation mechanism portion that operates the opening and closing of the valve plate; and
 a fixing device to fix the valve plate housing frame to the first chamber wall or the second chamber wall,
 wherein the fixing device includes:
  a fixation screw that is screwed into a screw hole formed perpendicularly to one of the first chamber wall and the second chamber wall, and a screw insertion hole that is formed perpendicularly to one of the first frame wall and the second frame wall of the valve plate housing frame corresponding to the one of the chamber walls and through which the fixation screw is passed, and
  a cam mechanism that generates a thrust force in a direction perpendicular to an axis of the fixation screw in the valve plate housing frame when tightening the fixation screw to press and fix the one of the frame walls against and to the one of the chamber walls, the cam mechanism formed on the fixation screw and in the screw insertion hole, and the other of the frame walls of the valve plate housing frame pressed against the other of the chamber walls of the chamber by the thrust force,
 wherein the cam mechanism has a cam surface that is a uniformly inclined surface formed on the fixation screw, and a cam receiving surface that is a uniformly inclined surface formed in the screw insertion hole, and an inclination direction and an inclination angle of the cam surface and an inclination direction and an inclination angle of the cam receiving surface are respectively equal to each other,
 the screw insertion hole further comprising a clearance hole extending through the one of the frame walls through which the fixation screw is passed and open to the screw hole, such that the fixation screw is consecutively inserted through the cam receiving surface, the clearance hole and the screw hole, and wherein the clearance hole has a diameter larger than the screw hole.

2. The gate valve according to claim 1, wherein the cam surface is formed on a cam member provided integrally with or separately from the fixation screw, and the cam receiving surface is formed on an inner surface of the screw insertion hole.

3. The gate valve according to claim 2, wherein the cam member is formed separately from the fixation screw, and is attached to the fixation screw in such a manner that the cam member is relatively rotatable about the axis of the fixation screw but is restricted from moving in the direction of the axis.

4. The gate valve according to claim 1, wherein the cam surface and the cam receiving surface are both planar.

5. The gate valve according to claim 2, wherein the cam surface and the cam receiving surface are both planar.

6. The gate valve according to claim 3, wherein the cam surface and the cam receiving surface are both planar.

7. The gate valve according to claim 6, wherein the cam member is non-circular in front view, the cam surface is formed on an outer surface of the cam member, the screw insertion hole has a cam member fitting portion in which the cam member is nonrotatably fitted, and the cam receiving surface is formed on an inner surface of the cam member fitting portion.

8. The gate valve according to claim 1, wherein the cam surface and the cam receiving surface both have conical surface shapes, and an outside diameter of the largest part of the conical surface forming the cam surface is smaller than an inside diameter of the smallest part of the conical surface forming the cam receiving surface.

9. The gate valve according to claim 2, wherein the cam surface and the cam receiving surface both have conical surface shapes, and an outside diameter of the largest part of the conical surface forming the cam surface is smaller than an inside diameter of the smallest part of the conical surface forming the cam receiving surface.

10. The gate valve according to claim 3, wherein the cam surface and the cam receiving surface both have conical surface shapes, and an outside diameter of the largest part of the conical surface forming the cam surface is smaller than an inside diameter of the smallest part of the conical surface forming the cam receiving surface.

11. The gate valve according to claim 9, wherein the cam member is cylindrical, the conical cam surface is formed on the cam member, the screw insertion hole has a small diameter hole portion and a large diameter hole portion that are circular and have different diameters, and the conical cam receiving surface is formed between the small diameter hole portion and the large diameter hole portion.

12. The gate valve according to claim 10, wherein the cam member is cylindrical, the conical cam surface is formed on the cam member, the screw insertion hole has a small diameter hole portion and a large diameter hole portion that are circular and have different diameters, and the conical cam receiving surface is formed between the small diameter hole portion and the large diameter hole portion.

\* \* \* \* \*